INVENTORS:
GUY B. ALEXANDER
EDWARD C. BROGE
& RALPH K. ILER

BY
ATTORNEYS

United States Patent Office 2,765,242
Patented Oct. 2, 1956

2,765,242

PROCESS OF MAKING REINFORCED SILICA GEL AND ESTERIFIED SILICA GEL

Guy B. Alexander, Greenville, Del., Edward C. Broge, Cecil County, Md., and Ralph K. Iler, Brandywine Hundred, Del., assignors to E. I. du Pont de Nemours & Company, Wilmington, Del., a corporation of Delaware Application February 29, 1952, Serial No. 274,198

16 Claims. (Cl. 117—118)

This invention relates to the preparation of silica gels and it is more particularly directed to processes in which a silica gel made up of a network of loosely aggregated particles is reinforced by heating, and the reinforced product is thereafter treated to replace the water with an organic liquid which is at least partially water miscible. The invention is also concerned with the weak, pulverulent xerogels produced acording to processes of the invention.

Figure 1:
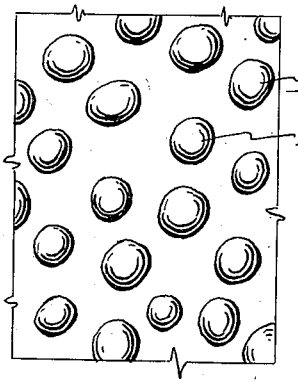
Figure 2:
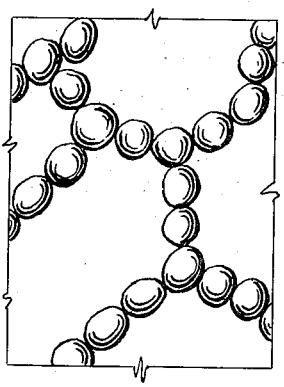
Figure 3:
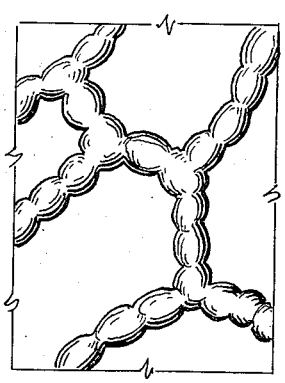
Figure 4:
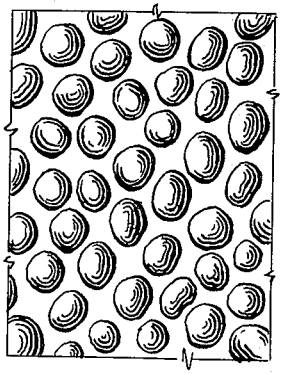
Figure 5:
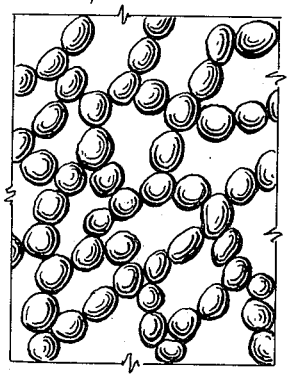
Figure 6:
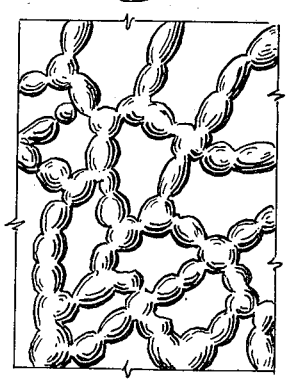
Figure 7:
Figure 8:
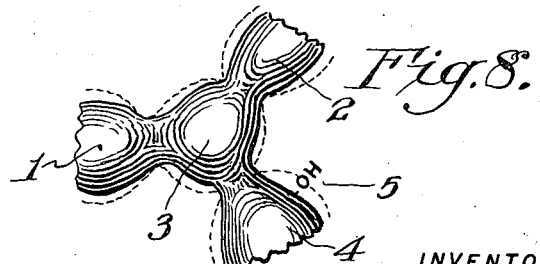

In the drawings Figure 1 shows the individual particles in a typical silica sol by illustrating the particles in a very thin layer of a sol, and Figure 2 is a similar showing of a silica gel derived from a sol of Figure 1 acording to a process of the invention, and Figure 3 is a similar showing of the further development of the gel of Figure 2 illustrating reinforcement of the gel according to the invention, and Figures 4, 5 and 6 show a similar series for a starting sol which is more concentrated, and Figure 7 is a detailed representation of a few isolated silica particles in a silica gel prior to reinforcement, and Figure 8 is a similar showing of the typical particles immediately after reinforcement.

Considering processes of the invention in somewhat more detail in connection with the drawings it will be seen that in Figure 1 there is illustrated a sol in which the particles such as 1 and 2 are rather widely spaced. It will be evident that the spacing of the particles in a silica sol will depend upon the size of the silica particles and their concentration in the aqueous phase. It is important in processes of the invention to use a wide enough spacing as will be seen in Figure 2.

In Figure 2 the sol of Figure 1 is shown as having gelled. The particles are loosely aggregated because the negative charge has been lowered so that the particles can come into contact with one another. However, the aggregation is only lose because the particles are barely joined to each other at the points of contact. The surface area of silica in a given volume of gel as shown in Figure 2 will be substantially the same as the surface area of the silica in the sol from which it was formed. It will be understood that in Figure 2, although the network is drawn as in a plane, both in this figure and in the others the sols and gels are three dimensional in space.

In Figure 3 there is illustrated the third step in the process now being described. The spheres of silica illustrated in Figure 2 have become cemented together or coalesced by the dissolution of silica from some parts of the silica surface and deposition of silica at the points of contact between the particles. This causes the particles to form a more rigid, and stronger, network.

However, it will be observed that the original gel structure as shown at Figure 2 is preserved in Figure 3.

Figures 4, 5 and 6 show a similar sequence in which the particles of the original starting sol are closer together and the gel network of aggregated particles as shown in Figure 5 is more compact than in Figure 2. Similarly, the final reinforced gel structure shown in Figure 6 is denser and more rigid and stronger than in Figure 3.

It should be noted that the degree of coalescence in Figure 6 corresponds approximately to that of Figure 3 representing a similar degree of redistribution of the silica.

In Figures 7 and 8 there is shown in somewhat more detail the manner in which the redistribution of silica is believed to occur.

In Figure 7 the silica particles of a portion of the gel network are shown at 1, 2, 3, and 4 prior to any appreciable degree of reinforcement. The arrows indicate the direction of transport of the silica during the process of reinforcement.

The reinforced gel structure as obtained from the gel of Figure 7 is shown in Figure 8. The dotted lines represent the original shape of the particles while the solid lines represent the shape after redistribution of the silica. It will be noted that the silica has been dissolved from the outwardly disposed portions of the silica particles and has been transported to fill the crevices at the original points of contact of the particles.

Thus according to processes of the invention it is desired to form open aggregates such as those shown in Figures 2 and 5 from appropriate starting sols and thereafter to strengthen the aggregates by heating, as will be more particularly described hereinafter. The reinforced network so produced can be removed from the aqueous system as, for example, by replacing or azeotropically distilling water off, using an organic liquid which is at least partially water miscible. The products produced are weak, pulverulent aggregates of high surface area and large pore diameter.

The reinforcement step described is important because the aggregates such as that shown in Figure 2 are exceedingly weak. If they are simply dried from water or from an organic solvent the surface tension forces cause complete collapse to a dense, close-packed mass. Such a mass after drying is very difficult to disintegrate to sub-microscopic units. On the other hand, a reinforced product such as that of Figure 3 is sufficiently strong so that after drying from an organic liquid it retains its open network structure to such an extent that upon compression or being subjected to mild shearing action it readily disintegrates to extremely small fragments.

It will be understood that it is not new to heat ordinary silica gels in order to harden them and to make them dense and tough. Such silica gels are prepared from sols which are much more concentrated than those illustrated in the figures and the gel networks are much more closely packed than those shown in Figures 2 and 5. For example, instead of each particle touching only two, three, or four other particles, in a close packed gel structure each particle may be in contact with as many as six or eight other particles. In that case redistribution of silica to effect reinforcement sets up an extremely rigid structure which cannot be disintegrated to sub-microscopic particles.

Referring again to Figure 2 it will be understood that it has heretofore been proposed to preserve the gel network as by releasing the liquid medium in which the network is formed at a temperature and pressure above the critical point so that the surface tension forces do not cause collapse of the structure.

According to processes of the present invention it is possible to convert a silica gel to a reinforced open network which can then be removed from a liquid system without resorting to the use of extremely expensive high pressure equipment. It is further to be noted that the products obtained have the advantage of being xerogels.

Forming the silica sol

Silica sols for use according to the present invention can be prepared by any of the prior art methods. While any silica sol may be used for the preparation of a gel, subject to certain limits of silica concentration and surface area as will be hereinafter described, it is preferred to use a silica sol which is composed of particles of colloidal dimensions, say about 3 millimicrons or larger. It is also preferred that the particles be no larger than about 50 millimicrons and it is most preferred to use sols containing uniform, unagglomerated spherical particles of about 3 to 15 millimicrons in diameter.

The silica concentration of sols to be used according to the present invention is from about 3 to 30 grams of $SiO_2$ per 100 milliliters. The particle size should be such as to provide an amount of silica surface corresponding to from 5 to 100 sq. meters per milliliter of sol. More specifically it is preferred to stay within the range of about 20 to 75 sq. meters of silica surface per milliliter.

The surface area of silica present in a given volume of sol may either be calculated from the size of the silica particles as observed by the electron microscope, assuming a density of 2.2 for amorphous silica, or it may be determined on a silica gel prepared from the sol under carefully controlled conditions by measuring the adsorption of nitrogen on the gel under standardized conditions.

The surface area of the silica in the sol may be determined by adjusting the pH of the sol to between 5 and 6, by suitable additions of either acid or base, and permitting the sol to gel. If a gel does not form within a reasonable period of time, say a matter of a few hours at ordinary temperatures, the sol may be concentrated by vacuum evaporation until a gel structure is formed. At no point should the gel be heated above about 30° C. The gel should be permitted to stand for 30 minutes. It is then broken up into small fragments and washed by decantation with water adjusted to pH 3 with hydrochloric acid until substantially all salts, if any, are removed. The gel is then washed with acetone to remove substantially all the water. The gel is then dried under vacuum at about 50° C. or less, and finally the product is heated to 125 to 150° C. for about two hours, preferably under vacuum, in order to remove physically bound water. The surface area is then determined by nitrogen adsorption by the method of P. H. Emmett, "A new method for measuring the surface area of finely divided materials and for determining the size of particles," Symposium on New Methods for Particle Size Determination in the Sub-Sieve Range, p. 95, published by the American Society for Testing Materials, March 4, 1941.

A silica sol suitable for use according to this invention may be made by passing a solution of sodium silicate through an ion exchange resin such as in the process described in the Bird Patent 2,244,325. A sol prepared directly by ion exchange in this way is composed of particles which are smaller than about 5 millimicrons in diameter. A suitable treatment for increasing the particle size of such sols is to adjust the pH, if necessary, to within the range of 7 to 10.5 and thereafter heat and age the sols until the particles have reached the desired size. Silica sols containing still larger particles may be made by processes as shown in the Bechtold and Snyder United States Patent 2,574,902 dated November 13, 1951.

Silica sols may also be prepared by the slow addition of acid to a dilute solution of sodium silicate. While the preparation of such sols is generally well understood in the prior art it will be noted that for use in processes of the present invention the amount of silica, related to its surface area, should be in the ranges previously described.

Gelling the sol

In preferred processes of the invention a sol prepared as above will be caused to gel by any of the methods already well understood in the art. When a silica sol, for example, containing the amount of silica required to provide a surface area per unit volume as above described is employed, it leads directly to the production of a gel having the same surface area per unit of gel volume. This follows, of course, because when such a sol gels it solidifies to a gel of a volume about equal to that occupied by the sol.

As has been noted the gel produced for further treatment according to processes of the invention should have a surface area of from about 5 to 100 sq. meters per milliliter of gel volume, and preferably from about 20 to 75. It should also contain from about 3 to 30 grams of $SiO_2$ per 100 milliliters of gel volume.

It might be noted that in more concentrated solutions, the ultimate silica particles are closer together. This can be seen in the comparison of Figures 1 and 4. The effect of increased concentration is a more dense gel network, as can be seen by comparing Figures 2 and 5. In Figure 5, the number of "junction points," i. e., the number of contact points per particle is increased on the average. Thus, increasing the silica concentration increases the number of contact points per particle in the resulting gel structure. On the other hand, more open and more porous gels can be prepared by gelling the product at a lower concentration. The silica concentration is limited to from 3 to 30 grams of $SiO_2$ per 100 milliliters of gel volume.

As particle size decreases, the size of the pores likewise decreases. However, it can be seen in the comparison of Figures 2 and 5, that as the concentration of silica decreases (Figure 2) the pore size increases. For smaller silica particles, it is preferred to effect gelation at a low silica concentration. Thus, the effect of smaller particles to yield a product of smaller pore size is at least partially offset by gelling at a lower concentration and thus increasing the pore size in that manner.

Additional variables which are important during the gelling step include the pH and the salt concentration, if any, in the system. Gelling can be most effectively brought about by lowering the charge on the silica particles so that a network can form, as shown in Figure 2 of the drawing. When the particles are in an alkaline solution in which there is no salt present, the particles have a high negative charge on their surfaces and as a result there is a strong repelling force between the particles so that they do not aggregate with each other to form a gel. Such a condition is shown in Figure 1 of the drawing.

However, if the pH of the solution is lowered to below about 7 the charge is decreased and the particles can approach each other to form a network, as shown in Figure 2. The charge can also be reduced, even at a higher pH, by the addition of a salt such as sodium sulfate, potassium chloride, ammonium nitrate, and others. In this case gelling may occur up to a pH of 10.7. Above this pH the silica tends to dissolve to form sodium silicate.

In the pH range below 7 gelling is rapid between pH 7 and 5 and is less rapid below pH 5, but gelling may be accelerated by heating the sol. Below about pH 3 there is considerable free acid and this is generally undesirable.

Sols containing less surface area per unit volume usually require a longer time to gel or may require higher temperatures in order to bring about gelling within a practical period of time.

While as mentioned above, salt may be added in order to accelerate gelling, this is not preferred since it introduces foreign material into the gel. Ordinarily any such foreign material will have to be removed from the final product.

While the preparation of a sol of specified silica content and surface and the preparation of a corresponding gel has been described above in some detail, it will be understood that these preparations may proceed in rapid succession. In fact, under some conditions it will be quite practical to prepare a sol of the desired character which will form a gel so rapidly as to be, for all practical purposes, instantaneous. Therefore, it is to be understood that the two steps can be merged into very rapidly consecutive steps which are substantially simultaneous. Thus the formation of the loose aggregates of Figures 2 and 5 may proceed almost directly under conditions conducive to gel formation. In such case, of course, when gels are formed by the interaction of a soluble silicate and an acid the gel will contain soluble salts. These should then ordinarily be removed, as by washing or dialysis. The preparation of a sol free from salts by the method of ion exchange is therefore to be preferred.

It is further to be noted, though it will be evident to one skilled in the art, that the sol used need not necessarily have precisely the silica content and surface area described since the surface area and silica content per unit volume can be adjusted by evaporation or dilution, as required to give a gel of the desired characteristics.

It is again to be noted that the gelling of sols is generally well understood and one skilled in the art can easily gel sols of the characteristics which have been specified above in a variety of ways beyond those shown.

*Reinforcing the gel network*

A gel prepared as above and having the structure of a loose network or aggregation, such as shown in Figures 2 and 5, is strengthened according to processes of the invention by heating in water.

In general, it is preferred to age the gel in a liquid medium and to avoid evaporation of liquid from the gel during this reinforcing process. If liquid is allowed to evaporate as the gel is being aged, there is a tendency for the gel network to collapse and, in general, this is not preferred. The amount of reinforcing desirable is to decrease the surface area of the silica product 10 to 75%. There is no particular advantage in decreasing the surface area greater than 75%, and indeed a decrease of 50% is found sufficient in most cases. In general, products of high surface area are preferred, and the more the reinforcing process is carried on, the lower the surface area becomes.

It might also be pointed out that reinforcement can be carried too far. Thus, if a silica gel is aged to the point where the surface area decreases more than about 75%, there is a tendency for the gel network to completely disintegrate and in some cases a sol may be produced. Referring to Figure 3, if aging is carried too far, some of the gel chains will be completely disintegrated and broken in two by the aging process, and the gel structure will be correspondingly weakened or disintegrated when this occurs.

Reference to Figures 3, 6, 7, and 8 further illustrates that the extent or degree of reinforcement is quite important in processes and in the products of the present invention. It is, of course, undesirable to reinforce the products too much, since in this event they will no longer be easily broken down and milled into rubber or other materials in use. It is therefore important to determine the extent of reinforcement of the aggregates or the strength of bonding between the ultimate units in the three dimensional network. It will also be evident that too little reinforcement will result in products which cannot be dried from organic liquids without collapse of the structure, collapse being undesirable for reasons pointed out above.

It has been found that in the case of the silica aggregates which are reinforced by heating gels according to the processes of this invention the units of the gel become cemented together at the "junction points." This cementing action is herein called "coalescence."

The degree of coalescence may be measured by a controlled depolymerization of the silica, measuring the per cent of silica which must be dissolved before the aggregates disintegrate to the ultimate units which disperse to a colloidal sol. This percentage is called the "coalescence factor."

In other words, referring to Figure 8 the degree of reinforcement or coalescence can be measured by dissolving away the silica until the structure falls apart at the junction point between the ultimate particles 1, 2, 3, and 4. It is noted that not all junction points may break because in this test only sufficient junction points need be broken that the gel structure is disintegrated to units of colloidal dimensions which may consist of several of the ultimate particles.

A method for determining coalescence is as follows:

A sample of the gel, properly prepared, is suspended in and permitted to dissolve slowly in a dilute solution of alkali. During dissolution, the course of the disintegration of the aggregates is observed by noting the decrease in the turbidity of the suspension. The aggregates, being supercolloidal in size, cause the suspension to be initially turbid; as the aggregates are disintegrated the turbidity of the suspension decreases and the transmission of light through the suspension increases. Simultaneously, the amount of silica which has passed into solution is determined analytically. From a curve obtained by plotting the percentage transmission of light through the suspension versus the per cent silica which has dissolved at the corresponding moment, the coalescence factor is determined.

In carrying out the determination of the coalescence factor, the specific surface area of the gel is measured by nitrogen adsorption, as already described in connection with the sols which may be utilized according to the processes of the invention. Acid-soluble components are removed by leaching the gel sample in hot (80–85° C.) 2N hydrochloric acid for thirty minutes and then washing to a pH of 4 with a minimum amount of water to remove any metal ions. Solids content of the resulting wet silica is determined by evaporation and ignition (to 450° C.) of a separate weighed sample.

The coalescence determination is carried out on a sample of the wet silica containing 1 gram of solids. The sample is diluted to 100 ml. with water, warmed to 50° C. in a stirrer equipped flask, and titrated with 1.0 N NaOH. Sufficient base is added immediately to raise the pH to about 11.2 (1.0 ml. per 90 m.²/g. of specific surface area, but not less than 1.5 ml. nor more than 4 ml.) and further steady addition is maintained at such a rate as to hold the pH as close as possible to 11–11.5. During this treatment, depolymerization, or solution of polymeric silica occurs because of the presence of hydroxyl ions. The product of this depolymerization is monomeric sodium silicate. The reaction of this monomeric silicate with acid molybdate reagent prepared from ammonium molybdate and sulfuric acid results in the formation of a yellow silico molybdate complex,

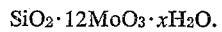

$$SiO_2 \cdot 12MoO_3 \cdot xH_2O.$$

It has been demonstrated that the color intensity of this complex is proportional to the amount of monosilicic acid which has reacted with the molybdate reagent. Not only does the molybdate reagent react rapidly with monomeric silicic acid, but the acid nature of the reagent practically arrests depolymerization of any high molecular weight colloidal silica present when an aliquot of the silica sample is mixed with the acid molybdate reagent. The reaction of this agent with monosilicic acid can therefore be used to determine the amount of monomer present in the depolymerizing solution at any given time.

The percentage transmission of light through the test solution and the percentage of the silica which has passed into solution are measured as frequently as possible during the depolymerization treatment. Transmission is measured by means of a Model DU Beckman Quartz Spectrophotometer at a wavelength of 400 millimicrons and a cell length of 1 cm. In making the analysis for dissolved silica, a 0.1 ml. aliquot from the depolymerization medium is diluted to 50 ml. with a freshly prepared 0.1 N $H_2SO_4$ solution of ammonium molybdate containing 4.0 g. of $(NH_4)_6Mo_7O_{24} \cdot 4H_2O$ per liter, and the optical density of the resulting solution is measured on the spectrophotometer. Distilled water is used as the reference solution for these measurements. The depolymerization is followed in this manner until about 80 or 90% of the total silica has been dissolved. This may be estimated from the fact that the sample was chosen to contain about 1.0 mg. of silica, and under the conditions of this experiment, if all of the silica were in the form of monomer, the optical density would be 0.72. In order to accurately determine the total silica content of the aliquot taken, the solution is then made about 0.5 N in NaOH and heated in live steam in an alkali-resistant flask for at least 2 hours, so that the last traces of silica are depolymerized to monomer. Total silica is then determined by the molybdic acid method above, and percentage silica at any point during the depolymerization is determined from the ratio of the optical density at that point to the optical density after all the silica in the sample was converted to monomer.

For samples composed of substantially spheroidal, dense ultimate particles which are aggregated or reticulated, the percentage of silica involved in the bonding or coalescence of these ultimate units is shown by the position of the inflection point in a plot of percentage soluble silica versus transmission.

The percentage soluble silica at the inflection point is termed the "coalescence factor" of the sample. The preferred products of this invention have a coalescence factor of from 30 to 80%.

The reinforcement of gel networks according to processes of the invention is preferably conducted in water at a pH no higher than about 10.7. It is preferred to use a pH no higher than about 8 because at a pH much higher than 8 there is a tendency for the gel structure to repeptize and break apart, or to undergo undesirable rearrangement. This tendency becomes particularly marked at high temperatures and in the absence of salts. On the other hand if the pH is below about 5, and especially below about 3, coalescence occurs slowly. This is particularly true for gels having a surface area less than about 200 sq. meters per gram. The preferred pH range, therefore, is between about pH 5 and 8, and the broad range of operability is between pH 3 and 10.7.

The temperature at which the gel may be heated to reinforce it varies from about 80 to 250° C. Gels of high specific surface area may be reinforced rapidly at 80 to 100° C., particularly those gels having surface areas greater than about 400 sq. meters per gram. For gels having surface areas between about 50 and 400 sq. meters per gram higher temperatures and pressures are preferred, to reduce the time required to obtain the desired degree of reinforcement. The time will, of course, depend in each instance upon the temperature and the pH selected and upon the degree of reinforcement desired. Thus under particular conditions the time should be that which will give a coalescence factor within the ranges already indicated and at a particular figure which is selected in each instance.

Aging occurs more rapidly in the presence of soluble salts, such as sodium sulfate and the like. However, it is not preferred to conduct the processes in the presence of added soluble salts because these then have to be washed from the gel to get a pure silica product. Such salts may be advantageously used as catalysts where the salts are present in the gels as formed, for example, as when the gel is formed by the reaction of acid and sodium silicate. It is advantageous, therefore, to leave the salts in the gel during the heat treatment because of their favorable catalytic effect, and then to remove them after the heat treatment rather than before.

Instead of relying entirely upon changes in the coalescence factor as previously described one can follow changes in the specific surface area of the silica gel being treated. In general, a decrease of surface area of from 10 to 50 per cent of the original surface area is desired. Thus, if the original gel network has a surface area of 300 sq. meters per gram it is desirable to heat the gel until the surface area has been reduced to the range from 270 to 150 sq. meters per gram.

Determining the surface area of the gel undergoing treatment is best carried out by washing the gel with very dilute acid to remove soluble salts and other impurities, followed by washing with distilled water and then acetone until free from water. The gel is then dried under vacuum and then finally heated to 150° C., preferably under vacuum, and the surface is determined by nitrogen adsorption as previously described.

Recovery of the products

After gel networks have been reinforced as shown in Figures 3 and 6 of the drawing, the products as thus prepared may be used as such without drying from water in applications in which an aqueous gel suspension is valuable. They may, for example, be added to rubber latex which is subsequently coagulated and milled to incorporate the silica into the rubber. They may similarly be used in other aqueous systems.

The advantages of the invention are more fully realized, however, when the reinforced gels are dried directly from the liquid medium. By reason of the reinforcement, it becomes possible to dry the silica directly from such liquid media without collapse of the gel structure. The particular liquid from which direct drying may occur is related to the specific surface area of the gel, but in any event, there is a liquid from which the reinforced gel may be dried.

Reinforced gels having a specific surface area less than 200 square meters per gram may be dried directly from water. It will be understood that among the more common liquids, water has the maximum surface tension and consequently has the maximum tendency to cause collapse of the gel structure during direct drying. Gels having a specific surface area less than 200 square meters per gram have a relatively massive structure, and when sufficiently reinforced, this structure is able to withstand the strain even when the liquid being dried off is water.

However, when the surface area of the gel is greater than 200 m.²/g., the forces in the capillary pores are so great than when water is removed the strain on the gel structure causes the structure to collapse. When this occurs, the gel chain fragments come in contact with one another to form new junction points and a chemical bond may be formed at these new junction points. When the product is then further dried, these new junction points become cemented together, and a hard, high density, difficultly dispersible product is produced. Thus, it is preferred, in drying products of this invention having a surface area greater than 200 m.²/g., to replace the water in the gel network with an organic liquid. It is especially preferred that this organic liquid be a water-miscible liquid, but partially water-miscible liquids such as normal butanol can be used with much success. In the most preferred case, the organic liquid used is an alcohol, such as n-propanol.

It should be pointed out that the value of 200 m.²/g. is only an average value, and that, in general, when gel is open-packed, i. e., when the concentration of silica in the gel network is very low, as for example, below about 5 grams of $SiO_2$ per 100 milliliters, there is a greater tendency for the gel structures to collapse, and it is preferred to dry products having surface areas even as low as 125 to 150 m.²/g., from an organic solvent. Moreover, when the reinforcing process has been carried on to only a moderate degree, so as to produce coalescence factors of about 30%, it might also be preferred to dry products having a surface area in the range of about 150 m.$^2$/g. from an organic liquid.

On the other hand, when the surface area is greater than about 400 m.$^2$/g., it is desirable to dry the product from a completely water-miscible organic liquid, and, in addition, to chemically inactivate the surface silanol groups of the product before drying. Thus, it is not desirable to transfer such products directly into n-butanol, since there is a tendency for such product structures to collapse when they are transferred from water directly into butanol. As has already been pointed out, this tendency to collapse increased as surface area increases, or as particles size decreases. Also, the tendency to collapse increases with lower degrees of reinforcement.

Chemical inactivation can be accomplished by methods described hereinafter.

In summary, then, there are three general categories: (a) For products having very low surface area, and which have a sufficiently reinforced, open-packed structure, the products can be dried directly from water by evaporation of the water, (b) for products of intermediate surface area and those having a close-packed structure and low degree of reinforcement, it is preferred to dry the products from an organic liquid which is at least partly miscible with water, and (c) for very high surface area products regardless of reinforcement or openness of packing, it is desirable to chemically inactivate the surface silanol groups and then dry the product which has been chemically inactivated, from an organic liquid which is completely miscible with water.

When it is said that a particular organic liquid is at least partially water-miscible, the organic liquid should dissolve in an aqueous phase at least to the extent of about one per cent and preferably about 4 or 5 per cent.

As examples of liquids which are at least partially water miscible there may be mentioned methyl, ethyl, propyl, isopropyl, and tertiary butyl alcohols; acetone, acetaldehyde, acetic acid, acrylonitrile, monomethyl ether of ethylene glycol, methyl acetate, dioxane, dioxolane, and the like. These are typical examples of organic liquids which are at least partially water-miscible for they are entirely water-miscible in all proportions. Other organic liquids which are at least partially water-miscible, and which, unlike the materials just mentioned, are not completely water-miscible at ordinary temperatures and pressures, are normal butyl alcohol, secondary butyl alcohol, amyl alcohols, methyl ethyl ketone, ethyl acetate, propyl acetate, isopropyl acetate, glycol diacetate, ethyl aceto acetate, methyl aceto acetate, butyraldehyde, butyric acid, methyl isobutyl ketone, mesityl oxide, acetyl acetone, 2-methyl-1,3-dioxolane, 4-methyl-1,3-dioxolane, methyl amyl alcohol, phenyl methyl carbinol, 2,4-pentane diol, 2-ethyl hexane diol-1,3, mono phenyl ether of ethylene glycol, phenyl ethyl alcohol, and benzyl alcohol.

Reinforced products prepared by the processes as above described can be treated with an organic liquid which is at least partially miscible to displace the water in the reinforced gel network. Where the organic liquid has only a low miscibility with water it is advantageous to use as an intermediate wash, an organic liquid which is completely miscible with water in order to remove a large portion of the water, after which the partially water miscible liquid may then be employed to advantage. Instead of displacing the water by the use of such organic liquids it will ordinarily be preferred to remove some of the water, and even the bulk of it, by azeotropic distillaiton with an organic liquid which is at least partially miscible. Again it may be noted that the azeotropic distillation may be begun with a liquid which is not water miscible. Thus excess water may be removed, for example, by azeotropic distillation with benzene but such distillation should be stopped short of the point at which collapse of the gel structure begins to occur.

Products of the invention can be recovered by heating to a temperature above or near the critical temperature of the organic liquid used and then venting the liquid at the high temperature. This, however, is not particularly advantageous and requires complicated and expensive equipment. If any appreciable amount of water is present during such a heating step, and there always will be quite a bit of water present unless it has been very carefully removed, the structure will be deleteriously affected, even to the point of complete disintegration.

In Figure 8 a silanol group is represented on the surface of the reinforced product at 5 with the symbols —OH. It will be understood that the surface of the silica structure is covered entirely with such hydroxyl groups attached to silicon atoms of the structure. When reinforced products of the invention are dried from non-aqueous liquids in accordance with the invention, these silanol groups have a tendency to cause the structures to collapse. The reason is not fully understood but it may be either because of the surface tension forces which are exerted upon the silica structure as the organic liquid is evaporated or due to the adhesion of the liquid to the silanol groups on the surface. Alternatively, the fact that the surface is covered with silanol groups makes it possible for the different particles to adhere to one another if they are brought into contact by the forces exerted on the structure when the liquid is removed. In either case the result is that the structure is more difficult to disperse, as by milling into an oil to make a grease or into other organic media.

To overcome this tendency, the hydroxyl groups on the surface may be inactivated by chemical reaction. Thus, a certain number of the groups may be reacted with relatively large organic molecules which protect the remaining underlying hydroxyl groups from coming in contact with hydroxyl groups on another particle.

The silanol groups, for example, may be chemically inactivated by treatment of the structure with such things as long chain amines like dodecyl amine, or they may be covered up by reaction with organosilicon resins such as are formed by the hydrolysis of methyltrichlorsilane. Quaternary ammonium compounds may similarly be used for chemical inactivation, and there may be used for instance, cetyl trimethylammonium hydroxide.

However, it is much preferred according to the processes of the invention to effect the chemical inactivation by reacting the silanol groups with an alcohol. This is especially economical and feasible because alcohols are also among the preferred materials for dehydrating the products.

The reaction of the silanol groups with alcohol does not occur until the water content of the system is quite low. It is preferred that the water content be below 5 per cent. In the normal course the water can be removed by azeotropic distillation using an alcohol such as one of those above named, like normal butanol, then after the water removal is substantially complete the treatment can be continued at an elevated temperature and pressure. The details of the process of effecting esterification of siliceous materials are fully set forth and are claimed generically in the application of Ralph K. Iler, Ser. No. 171,759, filed July 1, 1950, now abandoned. Reference is had to that application for further details on the method of effecting the process and on certain specific alcohols to use.

The products of the invention

Products prepared according to the processes as above described may vary widely in their properties. The specific surface area of the gel structures may range from about 50 square meters per gram up to around, say, 800 square meters per gram. Inasmuch as a principal objective of the present invention is to increase the strength of silica gel networks without decreasing their surface area in any extreme degree, preferred products of the present invention are those in which the gel structures have a specific surface area of at least 400 square meters per gram and no more than about 800 square meters per gram. The products are pulverulent and they are weak. That is, they may easily be milled into rubber, plastics, and the like to obtain uniform smooth dispersions in which a great deal of the silica is reduced essentially to the ultimate particle size.

The products are "xerogels." By this it is, of course, meant that they do not shrink markedly upon being wetted with the liquid from which they were dried and then dried again.

The openness of the structure of the products of the invention can be measured from the so-called "pore volume." This may be determined from the adsorption isotherms, as described by Holmes and Emmett, in Journal of Physical and Colloidal Chemistry, 51: 1262 (1947). Pore diameter values are obtained by simple geometry from an assumed cylindrical pore structure. The preferred products of the invention have a pore diameter greater than 4 millimicrons. Particularly preferred products of the invention have a ratio of pore diameter to diameter of the ultimate silica particles of greater than 1.5:1.

Linseed oil adsorption also gives an indication of openness of packing, the more open the packing the greater the oil absorption. The test may be carried out as described in A. S. T. M. Standards for 1949, vol. 4, p. 169. A 0.5–1.0 gram sample of the powder which has been dried at 110° C. is placed on a glass plate and raw linseed oil is added drop by drop, the mixture being stirred and gently mashed by means of a steel spatula until crumbling just ceases, and the product can be molded into a ball. As the sample of powder is titrated with oil, the oil penetrates the pores of the powder, filling all void space, both intra- and inter-aggregate. The powder remains essentially dry in appearance until the pores within the aggregates are filled, and then becomes increasingly cohesive as the voidage between the aggregates is filled. At the point that all free space is filled, the material loses its friable nature and can be molded into a ball. The amount of oil required in the test may be expressed in terms of ml. of oil per 100 grams of powder. For the products of this invention, the oil absorption depends upon the openness of packing of the ultimate units and the specific surface area. The preferred products of this invention have an oil absorption expressed in milliliters of oil per 100 grams of powder at least equal to and preferably greater than the specific surface area in square meters per gram.

Products of the invention may further be characterized by the size of the ultimate units, particularly where these are sufficiently large to be seen using an electron microscope, or, alternatively, the specific surface area (which is inversely related to the ultimate particle size) may be determined. Since this method is usually more convenient and is more particularly applicable to the preferred products of the invention it will usually be used. Specific surface area may be determined, as previously noted, by the nitrogen adsorption method of Emmett.

It has been shown experimentally that the number average particle diameter, $D_n$, can be related to the specific surface area, $A_n$, of dense amorphous silica particles by the relationship $(D_n)(A_n)=3000$ (accuracy $\pm 20\%$), $D_n$ being in millimicrons and $A_n$ in square meters per gram.

It has already been pointed out that the reinforcement is carried on to such a point as to obtain a desired coalescence. The coalescence factor is also, therefore, a characteristic of products of the invention.

The test for determining the coalescence factor, which has been previously described, is applicable to products having a specific surface area in the range of 400–800 square meters per gram, which is the range for the preferred products prepared by the processes of this invention. The dry sample is treated in the following way: Unless it is known that the dry powder is free from organic matter, a sample is ignited in a vertical tube in a slow stream of air, increasing the temperature in one hour to 250–450° C. Further ignition for thirty minutes at 450° C., in pure oxygen is employed to remove last traces of organic matter. Acid-soluble components are removed by leaching the ignited sample (or a sample free from organic matter) in hot (80–85° C.) 2N hydrochloric acid for thirty minutes and then washing to a pH of 4 with a minimum amount of water to remove any metal ions. Solids content of the resulting wet silica is determined by evaporation and ignition (to 450° C.) of a separate weighed sample.

The coalescence determination is then carried out as has been previously described. Preferred products according to the invention will have a coalescence factor from 30 to 80%.

Another of the characteristics of the preferred products of the invention is the uniformity of their structure. By this is meant a uniformity in regard to the size of the ultimate particles of which the structure is made, and also uniformity in regard to the formation of the gel network. The uniformity of the structure may be demonstrated in the process of carrying out the measurement of the coalescence factor by controlled depolymerization of the silica. Thus, the per cent light transmission of the sample is measured with the Beckman Spectrophotometer at a wave length of 400 millimicrons and a cell length of 1 cm. after 90% of the total silica has been dissolved, using water as the reference liquid. The percentage transmission as measured in this way is termed the "uniformity factor." If the uniformity factor of the sample is greater than 75%, the sample is substantially uniform. If a particular product fails to meet the test here described it may either be because it contains some very large ultimate particles making up the gel structure, mixed with many smaller particles, or it may indicate that the coalescence is not uniform or that the gel density varies from point to point throughout the structure.

Another characteristic of the products of the present invention is the range of the refractive index. The products of this invention have refractive indices in the range of 1.42 to 1.48. The index of refraction of silica samples may be determined by suspending the silica in various liquids of known refractive index until a liquid is found in which the silica is practically invisible, indicating identical indices of refraction for the liquid and the silica.

The toast may be carried out by suspending the silica in benzene (refractive index 1.5014), and adding heptane (refractive index 13867) to the suspension with stirring until the silica in the slurry becomes invisible. A sample of the supernatant mixed liquid is then removed by centrifugation, decantation or filtration, and the index of refraction of the liquid is determined with an Abbe Refractometer (see Gibb: "Optical Methods of Chemical Analysis," McGraw-Hill Book Co., 1942, p. 326ff.). The index of refraction of the silica is the same as that measured for the mixed liquid.

For those silicas having surface-adsorbed metal ions, it is desirable to remove these adsorbed ions by washing the product with a 2N hydrochloric acid solution at 80° C., followed by washing with acetone and drying at 125° C. prior to measuring refractive index.

Preferred products of the invention are further characterized by having their surface-silanol groups chemically inactivated. The fact of inactivation of the silanol groups can readily be ascertained by determining the dye adsorption and comparing this with the nitrogen adsorption. The total surface area of the non-inactivated hydroxyl groups, which is referred to as hydroxylated surface area, is calculated from the dye adsorption. The specific hydroxylated surface area of the products of this invention can be measured by a dye adsorption method.

This test indicates the surface area per gram of silica which is available to adsorb the methyl red dye molecule. For this test, it is necessary that the sample be dried at least 4 hours at 110° C., in an air oven, but in no case at a higher temperature than 150° C. This limitation on drying is necessary, since methyl red is adsorbed only on a hydroxylated surface, that is, a surface covered with silanol groups. The methyl red adsorption test is carried out by agitating, in 25 milliliters of an anhydrous benzene solution containing 0.6 to 0.7 grams of the acid form of methyl red, paradimethylamino azobenzene orthocarboxylic acid $((CH_3)_2NC_6H_4=NC_6H_4COOH)$ per liter, a suspension of a few tenths of a gram of the dried silica sample to be tested. No more than about 0.7 grams of this sample should be used in the test. Appreciably less must be used with voluminous samples, to avoid getting a mixture too thick to handle. Within the latter limitations, however, the amount of sample used should provide as near as possible a total available hydroxylated surface area of 10 square meters in the test. The test mixture is agitated for about two hours at about 25° C., to reach equilibrium conditions; a final concentration of about 400 milligrams of dye per liter in the solution after equilibration is necessary to insure saturation adsorption.

The decrease in dye concentration in the benzene solution is determined by adsorption spectrophotometric observations at 4750 A. of both the original and equilibrium benzene solutions of methyl red. The specific hydroxylated surface area in square meters per gram is calculated from the formula:

$$S_d = \frac{\text{grams dye adsorbed} \times 116 \times 10^{-20} \times \text{Avogadro's No.}}{\text{grams silica employed} \times \text{molecular weight of methyl red}}$$

where the covering power of each adsorbed methyl red molecule is approximately 1.16 square millimicrons.

If the silanols on a product of the invention have been inactivated to a marked degree the specific surface area by nitrogen adsorption will be at least twice the specific hydroxylated surface area as above described.

It will, of course, further be evident that the more completely the surface is protected the better the results, though some advantage will be obtained by using even smaller amounts of surface inactivation.

It will be noted also that when the surface is inactivated by reaction with an alcohol the alcohol can be recovered and identified by hydrolysis in the presence of small amounts of acid.

The products of the invention are useful for various purposes as has already been suggested. The dried products are useful as fillers for plastics and elastomers, providing valuable modification of the properties of the resulting mixtures. They are highly effective thickening agents for greases. The products are also useful for thermal insulation, as carriers for insecticides, extenders for powdered materials, as catalysts, and in general, for uses in which a chemically stable, finely divided solid material is desired. The products of this invention have the advantage of being readily disintegrated to colloidal fragments by mechanical shearing action in a fluid or plastic medium.

In order that the invention may be better understood reference should be had to the following examples which are given in addition to those already described as illustrative of the invention:

EXAMPLE 1

This is an example of the process which consists of forming a silica sol containing 7 millimicron particles (equivalent to a specific surface area of about 430 m.$^2$/g.), concentrating the sol to 15% $SiO_2$, gelling (the gel having 64 square meters of surface area per milliliter), reinforcing the gel network by heating the gel to 150° C., transferring the reinforced gel network to n-butanol and reacting the hydroxylated surface of the gel with butanol in order to chemically inactivate this hydroxylated surface, and finally drying the gel from butanol.

A slurry of 850 gm. of wet, drained (50% solids) "Amberlite IRC–50" resin in the hydrogen form and 1000 ml. of water is heated to 80° C. To this slurry is added 1000 ml. of a sodium silicate solution (20 gm. $SiO_2$/100 ml. and $SiO_2$:$Na_2O$=3.25) according to the following schedule:

| Time (Min.) | Ml. Silicate Added | T, °C. |
| --- | --- | --- |
| 0 | 0 | 80±2 |
| 1 | 125 | 80±2 |
| 5 | 400 | 80±2 |
| 10 | 600 | 80±2 |
| 15 | 750 | 80±2 |
| 20 | 900 | 80±2 |
| 25 | 1,000 | 80±2 |

This slurry is then filtered, using a filter cloth on a Buchner and applying a vacuum for about 15 seconds, yielding about 1400 gm. of filtrate containing about 12% $SiO_2$. The resin is washed on the filter with about 800 ml. of distilled water using the vacuum for about 15 seconds to remove the wash water, yielding 800 gm. of filtrate containing about 3% $SiO_2$. These two solutions are mixed.

The pH of this sol is lowered to 7.0 by adding about 175 grams of wet, drained "Amberlite IRC–50," hydrogen form, and stirring, for about 15 minutes. This reaction is carried out at about 60° C. The slurry is filtered and the resin washed with 100 ml. of distilled water.

Since sols prepared in this manner are somewhat turbid due to small particles of resin which settle very slowly, a filter aid such as "Celite" is added and the sol is refiltered.

The resulting sol contains 7 millimicron particles (specific surface area about 430 m.$^2$/g.) and about 8.3% $SiO_2$ by weight. The sol is then concentrated to about 15% $SiO_2$ by evaporation at reduced pressure and between 50–75° C.

This sol is converted to a readily dispersible silica powder as follows:

The sol is adjusted to pH 5.0 and heated to 90° C. until it gels. The wet gel is then aged at 150° C. for ½ hour, cooled and slurried with 2 parts of n-butanol for each part of wet gel. The butanol slurry is then dehydrated by azeotropic distillation until the water content is less than 0.2% in the alcohol phase, as determined by Fischer titration. This anhydrous slurry is heated to 300° C. for ½ hour in a stainless steel autoclave, cooled to room temperature, and the butanol removed by heating to about 120° C. in a vacuum oven for 24 hours.

The product is a hydrophobic, soft, fluffy, esterified silica xerogel. The fact that it is a xerogel can be demonstrated by wetting the product with methanol or butanol and drying by evaporation, as for example in a vacuum oven at 50° C. This can be done without significant change in the properties of the xerogel.

A sample prepared by the process as described above had the following properties: A surface area of 336 m.$^2$/g. measured by nitrogen adsorption, a pore diameter of 26.6 millimicrons, a bulk density obtained by gently tapping the sample to minimum value of 0.14 g./ml., a density under a load of 3 p. s. i. of 0.17 g./ml., a coalescence factor of 48% or 0.48, a uniformity of 80%, an oil absorption of 454 ml./100 g. of product, a refractive index of 1.457, carbon of 9.01 per cent, pH in a 1:1 methanol-water mixture of 7.30. A surface area of 336 m.$^2$/g. corresponds to particles having a diameter of about 9 millimicrons, hence the ratio of the pore diameter to particle diameter is about 3.

A grease was made from a sample of this silica by milling 4 g. of silica product with 26 g. of Mid-Continent, Solvent Treated oil of 300 SUV at 100° F. on an ink mill at 1.5 mill clearance for 7 passes. This grease had a micropenetration of 90. Micropenetration was measured by the ASTM method (ASTM Bulletin No. 14, August 1947, pages 81–85).

The composition of estersils in lubricating oils is claimed in the application of Ralph K. Iler, Serial No. 191,717, filed October 23, 1950, now U. S. Patent No. 2,676,148.

EXAMPLE 2

This is an example of a process and product of the invention. In this example the silica aqua gel was transferred from water to propanol (a completely water-miscible solvent).

A silica sol was prepared as follows: 350 g. of sodium silicate (having an $SiO_2/Na_2O$ ratio=3.25 and containing 28.4% $SiO_2$) was diluted to 1 liter and heated to 50° C. To this 20 gram portions of wet, drained (50% solids) "Amberlite IRC–50" resin in the hydrogen form were added every 2 minutes for a period of 20 minutes. The slurry was filtered, cooled, and further deionized to pH 5.92 by the batchwise addition of "Amberlite IRC–50" in the hydrogen form. It was estimated that the silica particles in this sol had a particle diameter of from 3 to 4 m$\mu$, corresponding to a surface area between 1000 and 750 m.$^2$/g. On standing, this sol gelled. The silica content of this gel was 7.07%.

Characterization of the gel: A sample of the fresh gel was washed several times with acetone and finally dried at 540° C. The dried powder had a surface area of 720 m.$^2$/g. Thus, the gel had an exposed surface area of 51 m.$^2$/ml.

Another sample of the gel was converted to a dispersible silica xerogel as follows: The gel was reinforced by heating at about 90° C. for 4 hours and dehydrated by azeotropic distillation using n-propanol. The propanol-silica slurry was then mixed with n-butanol and the propanol distilled off. The anhydrous n-butanol slurry was heated to 285° C. for ½ hour, cooled, and the excess butanol removed by evaporation in a vacuum oven at about 100° C. The dried powder was micropulverized.

Characterization of the Product: The resulting product had a hydroxylated surface area of 0 m.$^2$/g., as measured by dye adsorption, a bulk density of 0.38 g./ml., a density under a load of 3 p. s. i. of 0.39 g./ml., a coalescence factor of 99%, a uniformity factor of about 70%, and a per cent carbon of 15.3. The fact that the sample did not adsorb dye indicates that the surface hydroxyl groups in the gel had been chemically inactivated.

The sample was heated, first in a stream of air and then in oxygen, at 450° C., in order to burn off the organic coating. The sample so obtained had a specific surface area measured by nitrogen adsorption of 642 m.$^2$/g., and a pore diameter of 7.2 millimicrons. This shows that the network reinforcing process caused a decrease of 11 per cent in the surface area of the silica gel. The ratio of the pore diameter to the particle diameter was 1.6.

A sample of the product was milled into oil to form a grease at 13.3% loading, using the same technique as described in Example 1. The grease so obtained had a micropenetration of 49.

EXAMPLE 3

This is an example of a process and product of the invention. In this case, the silica gel was transferred directly into a partly water-miscible organic solvent, n-butanol. When compared with Example 2, this example shows the advantage of dehydrating the gel with a completely water-miscible organic solvent.

A sample of the same silica-aqua gel containing 7.07% $SiO_2$ described in Example 2 was used for this preparation. A sample of this gel was reinforced by heating for 4 hours at about 90° C. The gel was dehydrated by azeotropic distillation, using n-butanol. Distillation was continued until the slurry was essentially anhydrous. The slurry was then heated to 285° C. for about ½ hour, cooled, and the excess butanol removed by drying in a vacuum oven at about 100° C.

The product so obtained had a surface area of 526 m.$^2$/g. as determined by nitrogen adsorption, 0 m.$^2$/g. as determined by dye adsorption, and a per cent carbon of 14.16.

When milled into oil using the procedure as given in Example 1, a grease having a micropenetration of 63 was obtained. When compared with the result obtained in Example 2, it will be seen that the product of Example 3 did not make as thick a grease (small micropenetration values are characteristic of thick greases, the smaller the micropenetration, the thicker the grease), indicating that a product which is more easily dispersed is obtained when the silica aqua gel is transferred into a completely water-miscible organic solvent.

EXAMPLE 4

In this example, a silica gel was transferred to a partly water-miscible organic solvent which was not an alcohol. By comparison with Example 3, this example shows the beneficial effect which is obtained when the surface hydroxyl groups are chemically inactivated before drying.

A sample of the gel containing 7.07% $SiO_2$ which was used in Examples 2 and 3 was aged for about 5 hours at 90° C. This aged gel was then washed repeatedly with methyl ethyl ketone to remove the water. The last traces of water were finally removed by distillation. The sample was then dried by evaporating the organic solvent at 100° C. in a vacuum oven. Thus, the product was dried from an organic solvent, but without chemically inactivating the surface hydroxyl groups.

In order to compare the thickening ability of this product with those of Examples 2 and 3, the silica product was next converted to an estersil by the process of slurrying the silica in n-butanol, heating to 285° C., cooling, and removing the butanol by drying in a vacuum oven.

This estersil had a surface area of 451 m.$^2$/g. and 10.03% carbon. When milled with oil at 13.3% loading as per the procedure of Example 1, the product was a very thin grease, indicating that this product of Example 4 is not as readily dispersible as those of Examples 2 and 3. However, when the mixture of oil and silica was subjected to more severe milling, i. e., at a roll clearance of 0.2 mills for 4 passes, a grease having a micropenetration of 63 was obtained, indicating that the product was dispersed.

EXAMPLE 5

This is an example of the product of this invention. A sample of the same gel used in Examples 2, 3 and 4 was aged for about 6 hours at 90° C. This aged gel was washed repeatedly with methyl ethyl ketone and finally transferred to n-butanol by removing the ketone by distillation. The butanol slurry, containing 0.06% $H_2O$, was heated to 285° C., cooled and the butanol removed by drying at 110° C. in a vacuum oven. The resulting product had a surface area of 451 m.$^2$/g. as measured by nitrogen adsorption and a carbon content of 13.15%. The surface area as measured by dye adsorption was 0. The smaller surface area obtained in this example as compared with that of Example 3 is due to the fact that the gel of Example 5 was aged under more drastic time-temperature conditions (i. e., 6 hours at 90° C. vs. 4 hours at 90° C.), thus causing a greater percentage decrease in surface area in the case of Example 5.

When milled into oil on the ink mill, similar to the procedure explained in Example 1, the grease produced had a micropenetration of 60.

In this example the surface of the silica gel was chemically inactivated before drying by reacting some of the surface silanol groups with n-butanol. This example shows the benefits derived from chemical inactivation of the surface silanol groups prior to drying.

EXAMPLE 6

This example represents a process of the invention operated near the lower pH range and the upper range for the surface area per unit volume of the starting gel of about 100 m.$^2$/ml.

A solution of 700 ml. of a sodium silicate solution (prepared by diluting 3590 g. of "F" grade silicate having an SiO$_2$:Na$_2$O ratio=3.25 and SiO$_2$=28.4% with 1620 g. H$_2$O) was added to 200 ml. of 31% H$_2$SO$_4$ with stirring at 15° C. The sol was allowed to set to a silica gel, which was then washed essentially salt-free with distilled water; the pH was 3.16. The gel was next aged at 150° C. for 2 hours; the final pH was 3.57. The autoclaved gel was then slurried with n-butanol and dehydrated by distillation. The anhydrous butanol slurry was then heated to 285° C. for ½ hour. The excess butanol was removed by evaporation in a vacuum oven at about 100° C.

The product was characterized as follows: Surface area by nitrogen adsorption—523 m.$^2$/g., carbon analysis—14.4%; oil absorption—455 ml./100 gm. product, coalescence factor about 60%, a bulk density of 0.15 g./ml., and a density under a compressive load of 3 p. s. i. of 0.19 g./ml. Then milled into oil at a loading of 13.3% using an ink mill with 1.5 mill clearance for 7 passes, a grease having a micropenetration of 112 was produced.

EXAMPLE 7

This is a further example of the process and product of the invention:

A silica sol was prepared by passing a solution of sodium silicate (3# SiO$_2$; SiO$_2$/Na$_2$O=3.25) downward through an ion exchange column of "Nalcite HCR" in the hydrogen form. The sol had a pH of about 3.5; it was allowed to stand until it gelled. This gel was aged at 100° C. for 1 hour in a closed vessel. The gel was then transferred to n-propanol and finally to n-butanol by distillation. (Note: Because of the high surface area of the gel, it was first transferred into n-propanol as n-butanol is not completely miscible with water.) The anhydrous n-butanol slurry was heated to 285° C. for ½ hour. The product was finally dried for 16 hours in a vacuum oven at 102° C.

The silica xerogel had a surface area of 756 m.$^2$/g. as measured by nitrogen adsorption, carbon analysis= 17.31%, an oil absorption of 350 ml./100 gm. of product, density of 0.23 g./ml., a density under a bulk load of 3 p. s. i. of 0.26 g./ml., an average pore diameter of 8.0 millimicrons, a coalescence factor of 0.58 (58%), and a uniformity of 89%. As calculated from the surface area, the diameter of the ultimate units in the product was 4 m$\mu$. Thus the ratio of the pore diameter to particle diameter is 2.

This product was an excellent thickener for oil. Thus, when a sample was milled with oil according to the details given in Example 1, a very thick grease, having a micropenetration of 42, was produced.

EXAMPLE 8

This illustrates a process of the invention for the preparation of a low bulk density silica powder by autoclaving a large particle silica gel and drying the resulting reinforced gel from butanol.

A silica gel was prepared in the following manner: 800 ml. of silica sol, at a pH of 10, containing 30% by weight of ultimate dense spherical silica particles of about 17 m$\mu$ in diameter and containing a weight ratio of SiO$_2$ to Na$_2$O of 100 was stirred with an ion exchange resin in the hydrogen form until the pH of the silica sol had dropped to 6.5. The resin was removed by filtration and 725 ml. of the resulting sol was diluted to a total volume of 5.5 liters and 156 g. of anhydrous sodium sulfate was added. The mixture was stirred until the sodium sulfate was completely dissolved, giving a sol containing 4% SiO$_2$ and 0.4 N sodium ion. On standing, the sol became a gel. The gel thus formed had 7 square meters of surface area per ml. When a small portion of this gel was dried at 130° C. a hard dense gritty mass resulted, which was inferior as a filler or thickener for organic systems such as greases.

Most of the wet silica gel prepared as described above was heated in an autoclave to a temperature of 170° C. and a pressure of about 90 p. s. i. for a period of 2 hours. The gel was cooled to room temperature and slurried with an equal volume of water. The silica was then coagulated by adding to the suspension 0.2% of cetyl trimethylammonium bromide, based on the weight of the silica, and the precipitate so obtained was filtered, washed, re-slurried in a large volume of water which was then adjusted to a pH of 7, and re-filtered.

This washed, pH-adjusted, wet filter cake was slurried in an excess of n-butanol and the water in the system was removed by azeotropic distillation until the distillation temperature reached about 117° C., the boiling point of n-butanol. Thereafter the butanol slurry was filtered and the silica dried in an oven at a temperature of 130° C.

The resulting silica product was a light fluffy friable powder having the following properties: The ultimate particle diameter as determined from electron micrographs was 22 m$\mu$, the surface area as determined by nitrogen adsorption was 117 m.$^2$/g., and as determined by dye adsorption was 0 m.$^2$/g., the bulk density was 0.187 g./cc. under a compressive load of 3 lbs./sq. in. and 0.267 g./cc. under a compressive load of 78 p. s. i. The product was organophilic, passing into the alcohol layer when shaken with a two phase system of n-butanol and water. The product was an excellent, highly efficient filler in organic systems such as rubber. It could also be used as a thickener and anti-caking agent.

EXAMPLE 9

Silica particles of 5 millimicrons in diameter were prepared in the following manner: An ion exchange effluent containing 2% SiO$_2$ was prepared according to the Bird patent, in which a sodium silicate solution containing an SiO$_2$:Na$_2$O mole ratio of 3.36 and a silica concentration of 2% was passed downflow through an ion exchange column of "Nalcite HCR" resin in the hydrogen form. The ion exchange effluent had a pH of 3. This effluent was alkalized with ammonia to a pH of 8.6 and aged at 100° C. for a period of 3½ hours in a pressure bottle, so as to prevent the escape of ammonia. The resulting sol was then concentrated to 8% SiO$_2$ by direct evaporation of water.

The sol was gelled when the ammonia was allowed to escape and the pH dropped to 6.3. In this manner, a gel network consisting of ultimate particles of about 5 millimicrons in diameter was prepared.

This network was reinforced as follows: The gel was slurried with ammonia until the pH rose to 8.6, whereupon the gel was aged at this pH at 100° C. for a period of 2 hours. In this time, a coalescence occurred in which the particles became permanently cemented together.

This gel was then slurried with normal butanol and the water removed by azeotropic distillation. The anhydrous butanol slurry so obtained was heated to a temperature of 300° C. for a period of ½ hour. The slurry was then cooled and the excess butanol removed by heating in a vacum oven at 100° C. until constant weight was obtained.

The resulting product was light and very friable, readily milled into oil, yielding a grease having a micropenetration of 75, and characterized by having a nitrogen surface area of 294 m.$^2$/g., a per cent carbon of 6.19, and a density when compressed under a load of 3 p. s. i., of 0.20 g./ml.

EXAMPLE 10

A silica sol containing 3 millimicron particles (equivalent to a surface area of 1000 m.²/g.) was gelled at a pH of about 7. In this solution, the $SiO_2:Na_2O$ mole ratio was 300, and the $SiO_2$ content was about 4%. The gel was aged at 60° C. for 3 hours, in order to strengthen the reticulate network. The gel was then acidified with sulfuric acid to a pH of 5, slurried with n-propanol and n-butanol, and water and propanol were removed by azeotropic distillation. During this process the gel was further aged for about 2 hours at about 90° C. The resulting butanol slurry was heated to a temperature of 300° C. for ½ hour, and cooled. The excess butanol was removed from the product by drying at a temperature of 100° C. in a vacuum oven. The final product had a surface area as measured by nitrogen adsorption of 609 m.²/g., a per cent carbon of 15.6. Thus, heat aging decreased the surface area of the gel about 40%. The bulk density of the product was 0.10 g./ml. and density under 3 p. s. i. was 0.13 g./ml.

This product was an excellent thickener for oil; a grease prepared from the product according to the directions in Example 1 had a micropenetration of 42.

EXAMPLE 11

This is an example of the invention in which a prior art silica organo-aqua sol is used as a source of the silica to form the gel.

An organo-aquasol was prepared according to the Marshall patent, U. S. 2,386,247. Thus, 358 grams of "F" Grade sodium silicate solution was diluted with 162 grams of water. To this mixture 163 grams of 31% sulfuric acid was added, with stirring. The reaction was carried out at a temperature of about 10° C., producing a silica sol containing about 15% $SiO_2$. To this sol, 1375 grams of n-propanol were added gradually, with stirring, while maintaining the temperature at about 10° C. This caused substantially all of the sodium sulfate to precipitate, the salt being removed by filtration.

Conversion of the sol to a fine silica powder was accomplished by adjusting the pH of the sol to about 8 with aqueous ammonia, reinforcing the resulting gel by heating for about an hour at 100° C., transferring to n-butanol by distillation, heating the anhydrous butanol slurry at 300° C., thereby reacting the surface hydroxyl groups with n-butanol in order to chemically inactivate said hydroxyl groups, cooling and drying at 110° C. in a vacuum oven for 24 hours.

The product had a surface area by nitrogen adsorption of 622 m.²/g. and gave a grease with a micropenetration of 171 when milled at 10% loading into Mid-Continent solvent treated oil of 300 SUV at 100° F. on an ink mill at 1.5 mill clearance for 7 passes.

EXAMPLE 12

A silica sol containing 3 millimicron particles was prepared from an acid effluent in the following manner: A sodium silicate solution containing 3% $SiO_2$ and having an $SiO_2:Na_2O$ mole ratio of 3.25 was passed through an ion exchange column in the hydrogen form. The acid effluent so produced had a pH of about 3. This acid effluent was alkalized to an $SiO_2:Na_2O$ mole ratio of 121 by the addition of a sodium silicate solution. The resulting silica sol which had a pH of 7.48 was aged for about 1¼ hours at 100° C. This produced a silica sol containing about 3 millimicron particles. This sol was concentrated to 10% $SiO_2$ by direct boildown.

The sol was then gelled by dropping the pH to 5.96 with ion exchange resin in the hydrogen form. This sol was allowed to gel, by standing. The gel structure was reinforced by aging the gel. This was done by alkalizing the gel to a pH of 9.6 by the addition of sodium hydroxide, and heating the gel to reinforce the structure at a temperature of 100° C. for 2 hours.

The gel so produced was slurried with n-butanol and acid, the pH being about 6, and the water in the slurry was removed by azeotropic distillation. When the slurry was anhydrous, it was heated to a temperature of about 285° C. for ½ hour. The slurry was then cooled and the excess butanol was removed by evaporation in an oven at about 120° C.

The product had a specific surface area of 325 m.²/g., and a degree of esterification of 3.6 butoxy groups per square millimicron of surface area. When milled into oil according to the details of Example 1, a grease having a micropenetration of 117 was produced.

EXAMPLE 13

In this example, a silica sol containing 7 millimicron particles was gelled at a concentration of 10% $SiO_2$. The silica sol containing the 7 millimicron particles was prepared in a manner similar to the sol in Example 12, except that the effluent was alkalized to a ratio of 86 $SiO_2:1$ $Na_2O$ and heated for a period of 5 hours at 95°C. The sol was then concentrated by direct evaporation to 10% $SiO_2$. the pH dropped to 6.1, whereupon the sol gelled.

The gel network was reinforced by heating the gel to a temperature of 200° C. for a period of 2 hours in a sealed autoclave. The contents of the autoclave were cooled, and the gel so produced was slurried with n-butanol and dehydrated by azeotropic distillation with n-butanol. The anhydrous butanol slurry was heated to a temperature of 285° C. and cooled, whereby the surface silanol groups of the gel were esterified and thus chemically inactivated. The excess butanol in the slurry was removed by direct evaporation in an oven at about 120° C.

The product had a surface area of 201 m.²/g., and a degree of esterification of 3.7 butoxy groups per square millimicron of surface area. When milled with oil, according to the procedure above described in Example 1, a grease having a micropenetration of 105 was the result.

EXAMPLE 14

In this example a silica sol containing 5 millimicron particles was concentrated to 10% $SiO_2$, and the sol was gelled by lowering the pH of the sol to 6.0. The gel network so produced was reinforced by heating to a temperature of 100° C. for 1.5 hours, the pH during this heating and reinforcing process being 9.6. After the reinforcing process, the gel was dehydrated by azeotropic distillation with n-butanol, after having been pH adjusted to about 6. The anhydrous butanol slurry was heated to 285° C., in order to react the surface silanol groups of the gel with butanol. The resulting esterified product was dried by the direct evaporation of butanol.

The product had a surface area of 320 m.²/g., and a degree of esterification of 3.3 butoxy groups per square millicron. The grease produced according to the standard process of Example 1 had a micropenetration of 69.

EXAMPLE 15

In this example, a silica sol containing 17 millimicron particles was gelled at a concentration of 15% $SiO_2$. The silica sol used in this example is commercially available under the name of "Ludox"; it contains 30% $SiO_2$, has an $SiO_2:Na_2O$ mole ratio of about 100, a pH of about 10, and the silica particles are about 17 millimicrons in diameter. A sol of this type was diluted with distilled water to a concentration of $SiO_2$ of 15%. This silica sol was then acidified with concentrated hydrochloric acid (35.5% HCl) until the pH was dropped to 6.0. This sol was then gelled by heating in a steam bath for a period of about 15 minutes. The resulting gel was then reinforced by heating in a closed autoclave to a temperature of 200° C. for a period of 1 hour. The autoclave was cooled and the resulting reinforced gel was dried directly in a conventional type oven, operating at a temperature of about 140° C.

The resulting product was a friable, dispersible powder which could be readily milled into organic systems, and which when milled into rubber was an excellent reinforcing filler. This example shows that products can be prepared by direct drying from water, if the surface area of the product is below about 200 square meters per gram, and if the concentration of silica in the gel is above about 10%.

We claim:

1. In a process for making a reinforced silica gel from a silica gel having a surface area of from 5 to 100 sq. meters per milliliter of gel volume and a concentration of 3 to 30 grams SiO2 per 100 milliliters of gel volume, the step comprising heating the gel in water at a pH of from 3 to 10.7 and a temperature of 80 to 250° C. until the specific surface area of the gel has been reduced by from 10 to 50 per cent, and drying the product from a liquid medium.

2. In a process for making a reinforced silica gel from a silica gel having a surface area of from 5 to 100 sq. meters per milliliter of gel volume and a concentration of 3 to 30 grams SiO2 per 100 milliliters of gel volume, the steps comprising heating the gel in water at a pH of from 3 to 10.7 and a temperature of 80 to 250° C. until the specific surface area of the gel has been reduced by from 10 to 50 per cent, and thereafter replacing the water with an organic liquid which is at least partially water miscible.

3. In a process for making a reinforced silica gel from a silica gel having a surface area of from 5 to 100 sq. meters per milliliter of gel volume and a concentration of 3 to 30 grams SiO2 per 100 milliliters of gel volume, the step comprising heating the gel in water at a pH of from 3 to 10.7 and a temperature of 80 to 250° C. until the specific surface area of the gel has been reduced by from 10 to 50 per cent, replacing the water with an organic liquid which is at least partially water miscible, and drying to produce a weak, pulverulent xerogel.

4. In a process for making a reinforced silica gel from a silica gel having a surface area of from 5 to 100 sq. meters per milliliter of gel volume and a concentration of 3 to 30 grams SiO2 per 100 milliliters of gel volume, the step comprising heating the gel in water at a pH of from 3 to 10.7 and a temperature of 80 to 250°C. until the specific surface area of the gel has been reduced by from 10 to 50 per cent, replacing the water with an alcohol which is at least partially water miscible, and drying to produce a weak, pulverulent xerogel.

5. In a process for making a reinforced silica gel from a silica gel having a surface area of from 5 to 100 sq. meters per milliliter of gel volume and a concentration of 3 to 30 grams SiO2 per 100 milliliters of gel volume, the step comprising heating the gel in water at a pH of from 3 to 10.7 and a temperature of 80 to 250° C. until the specific surface area of the gel has been reduced by from 10 to 50 per cent and removing water from the gel by azeotropic distillation with an alcohol which is at least partially water miscible, and thereafter reacting the silica gel so produced with an alcohol in the presence of less than 5 per cent of water.

6. In a process for making a reinforced silica gel, the steps comprising gelling an aqueous silica sol comprised of silica particles of from 3 to 50 millimicrons in diameter and having a silica surface area of 5 to 100 sq. meters per milliliter of sol volume and a concentration of 3 to 30 grams SiO2 per 100 milliliters of sol volume, and heating the gel in water at a pH from 3 to 10.7 and a temperature of 80 to 250° C. until its specific surface area has been reduced by from 10 to 50 per cent.

7. In a process for making a reinforced silica gel the steps comprising gelling an aqueous silica sol comprised of silica particles of from 3 to 50 millimicrons in diameter and having a silica surface area of 5 to 100 sq. meters per milliliter of sol volume and a concentration of 3 to 30 grams SiO2 per 100 milliliters of sol volume, heating the gel in water at a pH from 3 to 10.7 and a temperature of 80 to 250° C. until the specific surface area of the gel has been reduced by from 10 to 50 per cent, and replacing water with an organic liquid which is at least partially water miscible.

8. In a process for making a reinforced silica gel the steps comprising gelling an aqueous silica sol comprised of silica particles of from 3 to 50 millimicrons in diameter and having a silica surface area of 5 to 100 sq. meters per milliliter of sol volume and a concentration of 3 to 30 grams SiO2 per 100 milliliters of sol volume, heating the gel in water at a pH from 3 to 10.7 and a temperature of 80 to 250° C. until the specific surface area of the gel has been reduced by from 10 to 50 per cent, and replacing water with an alcohol which is at least partially water miscible.

9. In a process for making a reinforced silica gel the steps comprising making an aqueous silica sol comprised of silica particles of from 3 to 15 millimicrons in diameter and having a silica surface area of 20 to 75 sq. meters per milliliter of sol volume and a concentration of 3 to 30 grams SiO2 per 100 milliliters of sol volume, gelling the said sol by adjusting the pH within the range of 5 to 8, and heating the gel at a temperature of 80 to 250° C. without adjustment of the pH to a figure outside the range of 5 to 8 until the specific surface area of the gel has been reduced by from 10 to 50 per cent.

10. In a process for making a reinforced silica gel the steps comprising gelling an aqueous silica sol comprised of silica particles of from 3 to 50 millimicrons in diameter and having a silica surface area of 5 to 100 sq. meters per milliliter of sol volume and a concentration of 3 to 30 grams SiO2 per 100 milliliters of sol volume, and reinforcing the gel by heating to a temperature from 80 to 250° C. at a pH of from 3 to 10.7 for a time long enough to reduce the specific surface area by 10 to 50 per cent.

11. In a process for making a reinforced silica gel from a silica gel having a surface area of from 5 to 100 sq. meters per milliliter of gel volume and a concentration of 3 to 30 grams SiO2 per 100 milliliters of gel volume, the step comprising heating the gel at a pH of from 3 to 10.7 and a temperature of 80 to 250° C. in a mixture of water and an organic liquid which is at least partially water-miscible until the specific surface area of the gel has been reduced by from 10 to 50 per cent, and drying the produce from a liquid medium.

12. In a process for making a reinforced silica gel, the steps comprising contacting a solution of a soluble silicate with a cation-exchange resin and heating in the pH range of 7 to 10.5 to make a sol of silica particles of from 3 to 50 millimicrons in diameter and having a silica surface area of 5 to 100 sq. meters per milliliter of sol volume and a concentration of 3 to 30 grams SiO2 per 100 milliliters of sol volume, gelling the sol, and heating the gel in water at a pH of 3 to 10.7 and a temperature of 80 to 250° C. until its specific surface area has been reduced by from 10 to 50 per cent.

13. In a process for making a reinforced silica gel, the steps comprising contacting a solution of a soluble silicate with a cation-exchange resin and heating in the pH range of 7 to 10.5 to make a sol of silica particles of from 3 to 50 millimicrons in diameter and having a silica surface area of 5 to 100 sq. meters per milliliter of sol volume and a concentration of 3 to 30 grams SiO2 per 100 milliliters of sol volume, gelling the sol, heating the gel in water at a pH of 3 to 10.7 and a temperature of 80 to 250° C. until its specific surface area has been reduced by from 10 to 50 per cent, and replacing water in the gel with an organic liquid which is at least partially water-miscible.

14. In a process for making a reinforced silica gel, the steps comprising contacting a solution of a soluble silicate with a cation-exchange resin and heating in the pH range of 7 to 10.5 to make a sol of silica particles of from 3 to 50 millimicrons in diameter and having a silica surface area of 5 to 100 sq. meters per milliliter of sol volume and a concentration of 3 to 30 grams $SiO_2$ per 100 milliliters of sol volume, gelling the sol, heating the gel in water at a pH of 3 to 10.7 and a temperature of 80 to 250° C. until its specific surface area has been reduced by from 10 to 50 per cent, replacing water in the gel with an organic liquid which is at least partially water-miscible, and esterifying surface silinol groups on the silica gel by distilling out water until the water content is below 5% and heating the gel to an elevated temperature in contact with an alcohol.

15. In a process for making a reinforced silica gel, the steps comprising contacting a solution of a soluble silicate with a cation-exchange resin and heating in the pH range of 7 to 10.5 to make a sol of silica particles of from 3 to 50 millimicrons in diameter and having a silica surface area of 5 to 100 sq. meters per milliliter of sol volume and a concentration of 3 to 30 grams $SiO_2$ per 100 milliliters of sol volume, gelling the sol, heating the gel in a mixture of water and an organic liquid which is at least partially water-miscible at a pH of 3 to 10.7 and a temperature of 80 to 250° C. until its specific surface area has been reduced by from 10 to 50 per cent, replacing water in the gel with an organic liquid which is at least partially water-miscible, and esterifying surface silanol groups on the silica gel by distilling out water until the water content is below 5% and heating the gel to an elevated temperature in contact with an alcohol.

16. In a process for making a reinforced silica gel the steps comprising gelling an aqueous silica sol comprised of silica particles having a surface area of 430 $m.^2/g.$ and a concentration of 15% $SiO_2$ and silica surface area in the sol of 64 $m.^2/100$ ml. of sol and reinforcing the gel by heating to a temperature of 150° C. for one-half hour at pH 6, whereby its specific surface area is reduced by from 10 to 50 per cent.

References Cited in the file of this patent
UNITED STATES PATENTS

| | | |
|---|---|---|
| 2,454,941 | Pierce et al. | Nov. 30, 1948 |
| 2,496,736 | Maloney | Feb. 7, 1950 |
| 2,588,853 | Kumins et al. | Mar. 11, 1952 |
| 2,601,235 | Alexander et al. | June 24, 1952 |
| 2,657,149 | Iler | Oct. 27, 1953 |